J. PLATT.
Grain Mill.
No. 2,282. Patented Oct. 9, 1841.
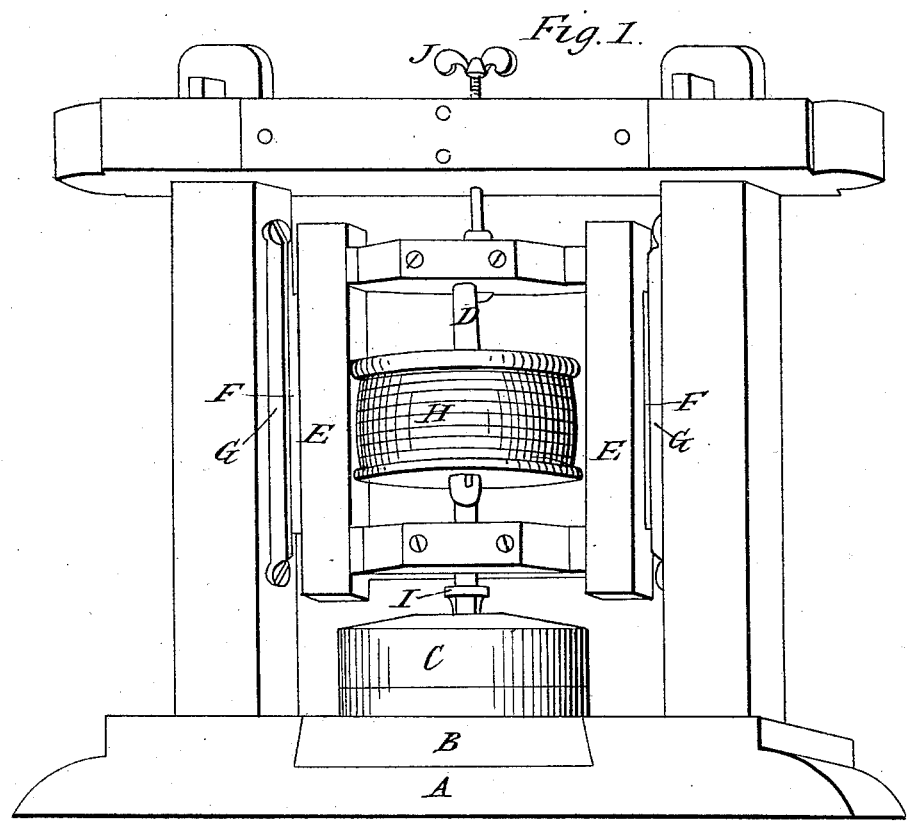
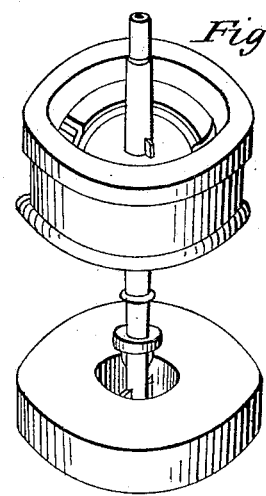
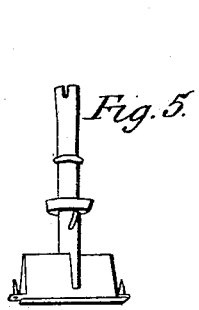
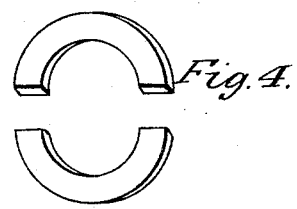
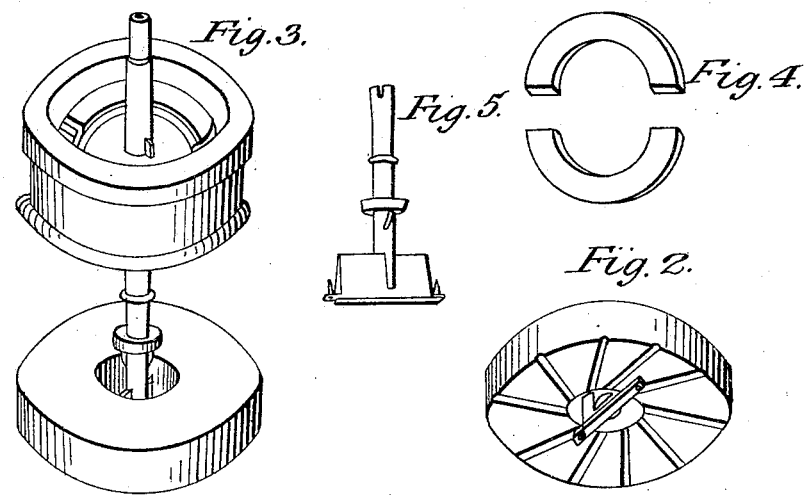

UNITED STATES PATENT OFFICE.

JOSIAH PLATT, OF WESTON, CONNECTICUT.

GRIST-MILL FOR GRINDING GRAIN.

Specification of Letters Patent No. 2,282, dated October 9, 1841.

*To all whom it may concern:*

Be it known that I, JOSIAH PLATT, of the town of Weston, in the county of Fairfield and State of Connecticut, have invented a new and Improved Manner of Constructing Mills for Grinding Grain and other Materials; and I do hereby declare that the following is a full, clear, and exact description of the construction and operation of the same, reference being had to the annexed drawing, marked Figure 1, making a part of this specification, which is a perspective view of that part of a mill for grinding grain or other materials in which the improvements are invented and to be used and is designed to exhibit my improvements, and to Figs. 2, 3, 4, and 5 accompanying the drawing and being sections of it.

My improvements are in the manner of suspending the spindle and the upper stone or runner fastened to it, above the bedstone, that is to say, by placing the bearings of the spindle with the upper stone or runner so fastened to it, in the girts or cross-pieces of a sliding frame above the bedstone which frame, with the spindle and upper stone or runner in it, is raised or lowered by a lever or levers and in that manner governing the spindle and upper stone or runner and also in suspending the upper stone or runner to the lower end of the spindle by having the bail work in a slit or cleft in the end of the spindle and the bail and the spindle jointed together and fastened by a pin passing through them and lastly in constructing the whirl or wheel, attached to the spindle so as to receive and hold semicircular weights in a circular cavity on the top to be used for the purpose of diminishing and equalizing the friction on the box or boxes in which the spindle turns and regulating the application of power and friction in the process of grinding.

To enable others skilled in the art of constructing mills for grinding grain and other materials to make and use my invention and construct a mill in my new and improved manner, I will proceed to describe its construction and operation. In the accompanying drawing, marked 1, A, is a stationary frame composed of a broad sill, two posts and a girt or cross-piece, at the top, the posts standing erect and being equidistant at each end. B, is a plank or frame containing the bedstone, the center of the bedstone being directly under the center of the spindle and the center of the upper stone or runner. C, is the upper stone or runner, having an eye therein, regularly flaring from the top to the bottom of it, with a flat bail or driver firmly fastened into either side of the upper stone or runner and crossing the center of the eye, as exhibited in Fig. 2 the thinnest or sharpened edge of the bail or driver being placed upward, so as to prevent the lodging of the grain or any other material upon it. D, is the spindle with two bearings and a convex rim on one or both of them. The spindle, as exhibited in Fig. 5, has a slit, cleft or opening in the lower end of it so large and formed as loosely to receive the bail or driver, through which and the spindle a pin or bolt is passed which must be fastened by a key or nut thus leaving sufficient play for the upper stone or runner to balance and press equally on the grain or other material to be ground, after it descends from the hopper through the eye of the upper stone or runner, as it passes between it, thus suspended and balanced on the lower end of the spindle, and the bedstone E, E, are the posts of a sliding frame confined at the bottom and top by two girts or cross-pieces in one side of each of which is a box consisting of two semicircular parts, one part being placed in the side of the girt and the other in a piece of wood or metal which is fastened and held to the girt by screws or otherwise, thus forming a box, one or both of the boxes is to be concave and may be tightened when necessary by the screws, through which boxes the spindle D, passes and in which the spindle is suspended by a convex rim or rims upon it to fit and conform to the box in which it runs. F, F, are two convex pieces of iron or any other material fastened by screws or otherwise to the posts of the sliding frame E, E, and fitted to G, G, two concave pieces of iron or other material fastened to the posts of the stationary frame, in any proper mode, thus holding the spindle and sliding frame in a perpendicular position. H, is the whirl of wheel on the spindle, through the center of which the spindle passes to be moved by a strap or cogs or in any other mode, there being in the top of the whirl or wheel, as seen in Fig. 3, a circular cavity to receive semicircular weights which may be added or removed according to the power applied and the quantity of grain to be ground in a given time, thus preventing almost all friction on either side of the concave box or boxes by the convex rim or rims on the spindle. I, is an oil cup to be fastened to the spindle close under one or both of the girts or cross-pieces of the sliding frame for the purpose of receiving the waste oil from the boxes. On the lower box or close under it, on the spindle, are two projections for the purpose of shaking the shoe through which the grain passes. J, is a screw turning in a box placed in the upper part of the girt or cross-piece of the stationary frame which screw passes through that girt and into and through the upper girt or cross-piece of the sliding frame, on each side of which last mentioned girt is a square shoulder or nut firmly fastened to the screw or forming a part of it, so that the lower end of the screw may turn, in the girt or cross-piece, with a washer for each shoulder to turn on, the lower end of the screw being a rod without a thread but the upper end of the screw to have a thread on the post moving in the box. The sliding frame together with the spindle and the upper stone or runner and all their appendages are then suspended and held by the screw, so that they may be easily raised and lowered by means of it.

Fig. 4, represents semicircular weights to be placed in the circular cavity, on the top of the whirl or wheel for the purpose and in the manner already stated.

Now I am aware that the upper stone or runner of a mill for grinding grain has been operated by a spindle working in boxes above it, and that it has been weighted by attaching weights to the top thereof and hence I do not claim for these things but I wish to confine my claim to the peculiar manner in which I have effected these things, that is to say,

I claim as my invention and improvement and I desire Letters Patent for—

1. Suspending the spindle of the upper stone or runner by a sliding frame in the manner and for the purpose above specified.

2. I also claim the suspending the upper stone or runner to the lower end of the spindle by having the bail work in a slit or cleft in the spindle and the two jointed together and fastened by a pin passing through them as already described.

3. And finally I claim regulating the weight and friction of the upper stone or runner by placing semicircular weights in a cavity made therefor in the upper part of the whirl or wheel as herein described.

JOSIAH PLATT.

Witnesses:
C. A. BLAKEMAN,
RUFUS BLAKEMAN.